No. 658,684.  
J. F. SMITH.  
DRAFT EQUALIZER.  
(Application filed July 6, 1900.)  
Patented Sept. 25, 1900.

(No Model.)

WITNESSES:  
M. S. Bloudel.  
Edw. W. Byrn.

INVENTOR  
John F. Smith.  
BY Munn & Co.  
ATTORNEYS

THE NORRIS PETERS CO., PHOTO-LITHO., WASHINGTON, D. C.

UNITED STATES PATENT OFFICE.

JOHN F. SMITH, OF PARKER, SOUTH DAKOTA, ASSIGNOR TO OLIN RANSOM GOULD AND JAMES SILK BUCKINGHAM COOK, OF CHARLES CITY, IOWA.

DRAFT-EQUALIZER.

SPECIFICATION forming part of Letters Patent No. 658,684, dated September 25, 1900.

Application filed July 6, 1900. Serial No. 22,670. (No model.)

*To all whom it may concern:*

Be it known that I, JOHN F. SMITH, of Parker, in the county of Turner and State of South Dakota, have invented a new and useful Improvement in Draft-Equalizers, of which the following is a specification.

My invention is in the nature of an improved three-horse draft-equalizer or draft-equalizer having a preponderance of team on one side of the tongue or fulcrum-point; and it consists in the peculiar construction and arrangement of parts, which I will now proceed to describe with reference to the drawings, in which—

Figure 1:
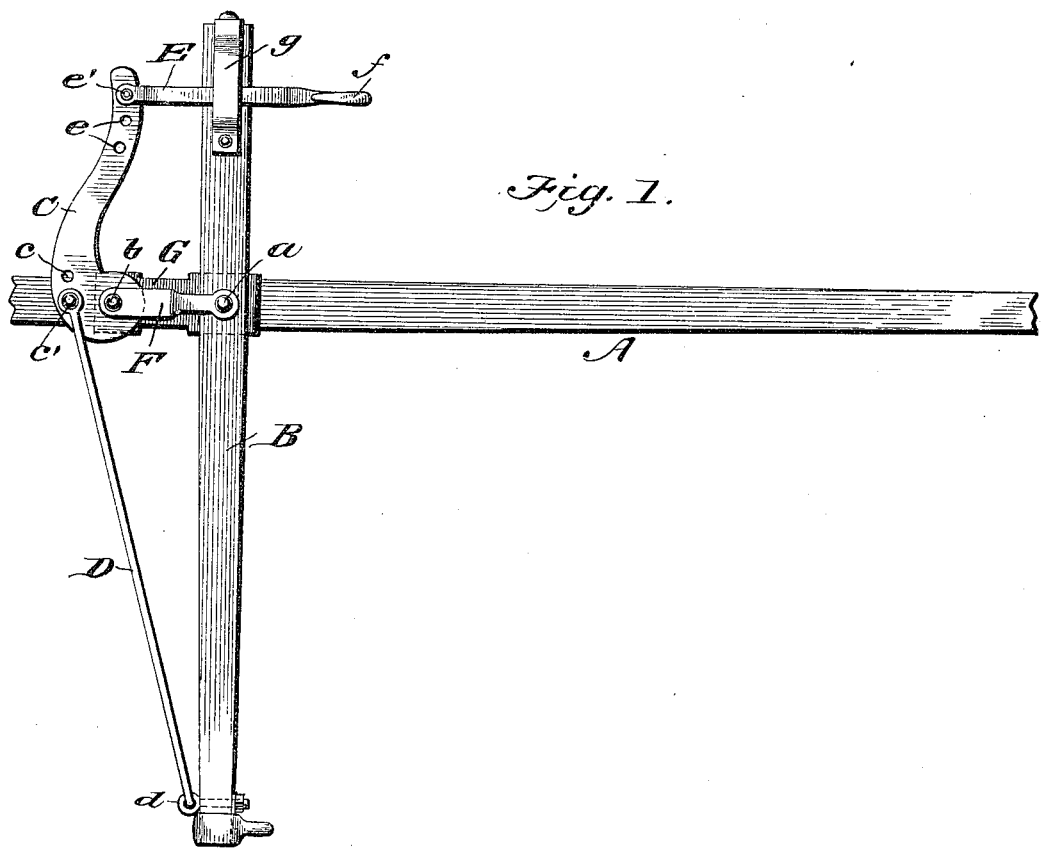
Figure 2:
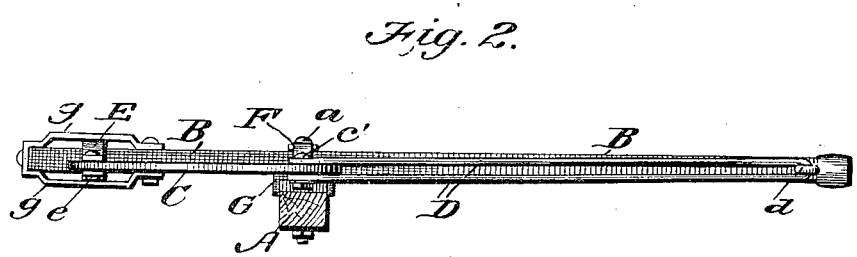

Figure 1 is a plan view, and Fig. 2 a rear edge view.

In the drawings, A represents the tongue of any vehicle, to which is fulcrumed at $a$ the lever B, projecting about twice as far on one side of the fulcrum as it does on the other. At a point on the tongue in rear of the fulcrum $a$ there is fulcrumed at $b$ a headed lever C, which has in rear of its fulcrum $b$ two or more holes $c$, through which passes a bolt $c'$, that passes through eyes formed in the ends of the branches of a double link-bar D, which at the other end is anchored in an eyebolt $d$, secured in the outer end of the long arm of lever B. The end of the headed lever C is curved forwardly toward the lever B and is provided with a series of holes $e$, any one of which is by a bolt $e'$ connected to the rear end of a double draft-link E, one section of which passes above and the other below the short end of lever B and after being united terminate in a draft-hook $f$, to which the singletree of the single horse is attached. Where the link E passes across the lever B, a metal strap $g$ extends around the end of said lever and incloses and guides the link as it vibrates back and forth.

F is a yoke-plate which connects the fulcrum-pins $a$ and $b$ for mutual strength and support, and G is a metal face-plate mounted upon the upper surface of the rear end of the tongue where the levers B and C are fulcrumed, so as to reduce friction and wear and keep tongue from splitting.

In connecting the team one animal is attached to the draft-hook $f$ opposite the short end of lever B and the pair of animals is attached to the long end of the lever on the other side. By the peculiar arrangement and compound leverage exerted by the headed lever C and its link-bar D the pull of the one animal is enabled to balance the pull of the other two. For the maximum leverage that is to be exerted by the single horse the draft-link E is connected to the outer hole in lever C and the link-bar D is connected in the hole nearest to the fulcrum of lever C, and to diminish the leverage link E is adjusted closer to the fulcrum of lever C and link-bar D farther from said fulcrum.

I am aware that more or less complicated devices for equalizing the draft strain of the team have heretofore been devised. My invention is distinctive in its simplicity, and the fact that the compounding-lever C has its connection $c'$ for the long end of lever B at a point immediately behind the fulcrum $b$ of said lever C, so that the movement of the point of connection $c'$ (in transferring the draft strain of the single horse to the long end of lever B) is at right angles to the line of draft. This permits lever C to be put close behind B, thereby shortening the length of tongue required and greatly simplifies the device. It also does away with all side draft on the tongue.

Having thus described my invention, what I claim as new, and desire to secure by Letters Patent, is—

1. A draft-equalizer, comprising a main lever having a long arm projecting on one side of its fulcrum, a second compounding-lever arranged close behind the first and provided with enlarged head fulcrumed in rear of the first-named lever, a link connecting this lever immediately behind its fulcrum to the outer end of the main lever-arm, and a draft-link attached to the end of the rear or compounding lever and arranged on the opposite side of the fulcrum of the main lever from its long end substantially as described.

2. A draft-equalizer comprising a main lever having arms of unequal length on opposite sides of its fulcrum, a second compounding-lever arranged close behind the first, and having an enlarged head fulcrumed in rear of the first-named lever, and projecting in the same direction as its short arm, a link connecting the rear lever immediately behind its fulcrum to the outer end of the long arm of the main lever, and a draft-link attached to the end of the rear lever and arranged to cross the short end of the main lever and be supported and guided thereby substantially as described.

3. A draft-equalizer comprising a tongue, lever B fulcrumed thereto at a point outside of its middle, a headed lever C arranged close behind the lever B and fulcrumed to the tongue in rear of lever B, a link-bar D connected to the head of lever C directly in rear of the fulcrum of the latter and also to the long end of lever B, the draft-link connected to lever C and embracing the short end of lever B, and a strap or keeper attached to said lever B and embracing the draft-link substantially as described.

In testimony whereof I have signed my name to this specification in the presence of two subscribing witnesses.

JOHN F. SMITH.

Witnesses:
F. C. DANFORTH,
J. A. DANFORTH.